(12) United States Patent
Fujisawa et al.

(10) Patent No.: US 8,848,798 B2
(45) Date of Patent: *Sep. 30, 2014

(54) INFORMATION PROCESSING APPARATUS AND INTER-PREDICTION MODE DETERMINATION METHOD

(75) Inventors: Tatsuro Fujisawa, Akishima (JP); Yoshihiro Kikuchi, Hamura (JP); Yuji Kawashima, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1275 days.

This patent is subject to a terminal disclaimer.

(21) Appl. No.: 12/186,074

(22) Filed: Aug. 5, 2008

(65) Prior Publication Data

US 2009/0285285 A1 Nov. 19, 2009

(30) Foreign Application Priority Data

Aug. 21, 2007 (JP) ................................. 2007-214974

(51) Int. Cl.
| | |
|---|---|
| *H04N 7/30* | (2006.01) |
| *H04N 19/176* | (2014.01) |
| *H04N 19/61* | (2014.01) |
| *H04N 19/122* | (2014.01) |
| *H04N 19/147* | (2014.01) |
| *H04N 19/109* | (2014.01) |

(52) U.S. Cl.
CPC ... *H04N 19/00084* (2013.01); *H04N 19/00278* (2013.01); *H04N 19/00781* (2013.01); *H04N 7/50* (2013.01); *H04N 19/00175* (2013.01); *H04N 19/00036* (2013.01)
USPC .................................. 375/240.18; 375/240.14

(58) Field of Classification Search
USPC .................. 375/240, 240.02, 240.12, 240.13, 375/240.14, 240.16, 240.18, 240.2, 240.24; 348/384.1, 394.1, 403.1, 404.1, 409.1, 348/411.1
See application file for complete search history.

(56) References Cited

U.S. PATENT DOCUMENTS

| | | | | |
|---|---|---|---|---|
| 6,724,818 | B1 * | 4/2004 | Frojdh et al. | 375/240.07 |
| 7,280,597 | B2 * | 10/2007 | Zhang et al. | 375/240.16 |
| 7,643,559 | B2 * | 1/2010 | Kato et al. | 375/240.23 |
| 2002/0186765 | A1 * | 12/2002 | Morley et al. | 375/240.2 |

(Continued)

FOREIGN PATENT DOCUMENTS

| | | |
|---|---|---|
| JP | 2003-319394 | 11/2003 |
| JP | 2005-151017 | 6/2005 |

(Continued)

OTHER PUBLICATIONS

Japanese Office Action dated Jun. 14, 2011.

*Primary Examiner* — Curtis A Alia (74) *Attorney, Agent, or Firm* — Pillsbury Winthrop Shaw Pittman, LLP (57) ABSTRACT

According to one embodiment, an information processing apparatus which encodes a moving image signal, includes an inter-prediction mode determination unit which determines a combination of an inter-prediction mode used by an inter-prediction unit and a DCT used by a transformation unit among from an inter-prediction modes and a DCTs, for each of macroblocks. The inter-prediction mode determination unit includes a first selection unit which selects DCTs of a predetermined number from the DCTs, for at least one specific inter-prediction mode among the inter-prediction modes, and a second selection unit which selects a combination of one inter-prediction mode and one DCT from the inter-prediction modes and the DCTs of the predetermined number selected by the first selection unit.

13 Claims, 6 Drawing Sheets

(56) References Cited

U.S. PATENT DOCUMENTS

| | | | |
|---|---|---|---|
| 2004/0086042 A1* | 5/2004 | Kim et al. | 375/240.08 |
| 2005/0249291 A1* | 11/2005 | Gordon et al. | 375/240.18 |
| 2005/0276331 A1* | 12/2005 | Lee et al. | 375/240.17 |
| 2006/0215763 A1* | 9/2006 | Morimoto et al. | 375/240.18 |

FOREIGN PATENT DOCUMENTS

| | | |
|---|---|---|
| JP | 2006-148419 | 6/2006 |
| JP | 2006-332986 | 12/2006 |
| JP | 2007-201558 | 8/2007 |
| JP | 2008-205627 | 9/2008 |
| JP | 2008-219205 | 9/2008 |

* cited by examiner

INFORMATION PROCESSING APPARATUS AND INTER-PREDICTION MODE DETERMINATION METHOD

CROSS-REFERENCE TO RELATED APPLICATIONS

This application is based upon and claims the benefit of priority from Japanese Patent Application No. 2007-214974, filed Aug. 21, 2007, the entire contents of which are incorporated herein by reference.

BACKGROUND

1. Field

One embodiment of the present invention relates to an encoding technique for moving images, which is suitably applicable to information processing apparatuses such as personal computers.

2. Description of the Related Art

In recent years, personal computers equipped with software encoders, which encode moving images by software, have come into widespread use. Further, recently, attention has been given to H.264/Advanced Video Coding (AVC) as a next-generation moving-image compression encoding technique. H.264/AVC is a compression encoding technique with higher efficiency than conventional compression encoding techniques such as MPEG2 and MPEG4. Therefore, encoding processing compliant with H.264/AVC requires a processing amount larger than that required in conventional compression encoding techniques such as MPEG2 and MPEG4. Thus, there have been made various propositions to reduce the encoding processing amount of moving images thereof (for example, refer to Jpn. Pat. Appln. KOKAI Pub. No. 2006-332986).

Encoding processing compliant with H.264/AVD has a large processing amount in a determination of a prediction mode for each macroblock. In particular, in High Profile (HP), when the block size of the prediction mode is 8×8 pixels or more in inter-prediction, it is possible to select the most suitable one from either of a discrete cosine transform (DCT) with a block size of 4×4 pixels and DCT with a block size of 8×8 pixels. Therefore, the processing amount required for prediction mode determination of the inter-prediction increases in proportion to the number of prediction mode candidates (since there are substantially prediction modes of a number twice as large as the number of selectable prediction modes). Thus, it is strongly desired to achieve a mechanism for efficiently performing prediction mode determination, while deterioration in image quality is suppressed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus which encodes a moving image signal, includes an inter-prediction mode determination unit which determines a combination of an inter-prediction mode used by an inter-prediction unit and a DCT used by a transformation unit among from an inter-prediction modes and a DCTs, for each of macroblocks. The inter-prediction mode determination unit includes a first selection unit which selects DCTs of a predetermined number from the DCTs, for at least one specific inter-prediction mode among the inter-prediction modes, and a second selection unit which selects a combination of one inter-prediction mode and one DCT from the inter-prediction modes and the DCTs of the predetermined number selected by the first selection unit.

Figure 1:
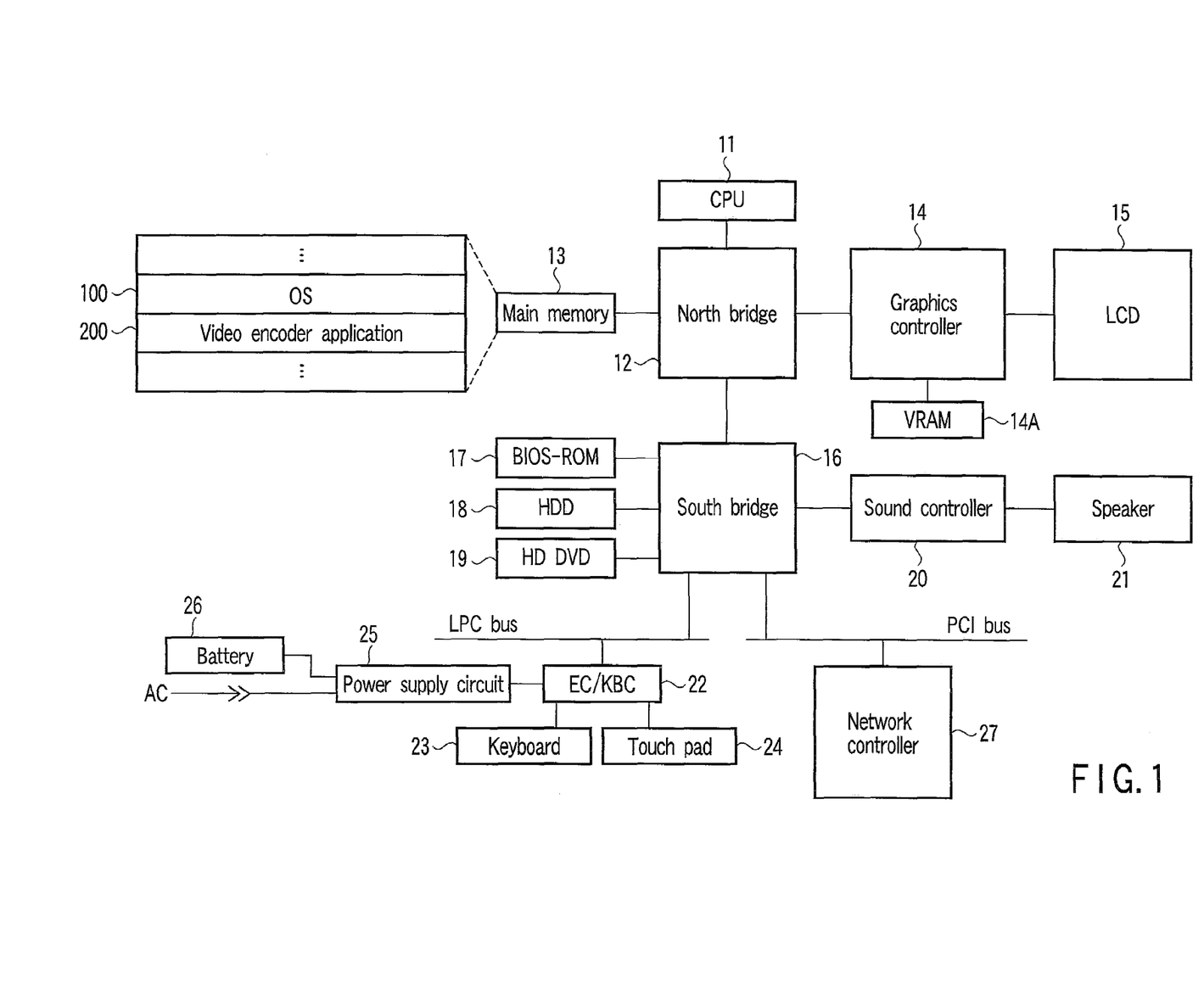
FIG. 1 is an exemplary diagram illustrating a configuration of an information processing apparatus according to an embodiment of the invention.

FIG. 1 illustrates a configuration example of an information processing apparatus according to the embodiment. The information processing apparatus is realized as a notebook personal computer which can be driven by a battery.

As illustrated in FIG. 1, the computer includes a CPU 11, a north bridge 12, a main memory 13, a graphics controller 14, a VRAM 14A, an LCD 15, a south bridge 16, a BIOS-ROM 17, an HDD 18, an HD DVD 19, a sound controller 20, a speaker 21, an embedded controller/keyboard controller IC (EC/KBC) 22, a keyboard 23, a touch pad 24, a power supply circuit 25, a battery 26, and a network controller 27.

The CPU 11 is a processor which controls operation of the units in the computer. The CPU 11 executes an operating system (OS) 100 and various application programs, which include utility and operate under the control of the OS 100, which are loaded from the HDD 18 to the main memory 13. The application programs include a video encoder application 200. The video encoder application 200 is software to encode moving images, and operates as a software encoder compliant with the H.264/AVC standard. Further, the CPU 11 also executes a BIOS stored in the BIOS-ROM 17. The BIOS is a program for controlling various hardware.

The north bridge 12 is a bridge device which connects a local bus of the CPU 11 and the south bridge 16. The north bridge 12 has a function of executing communications with the graphics controller 14 through a bus, and includes a memory controller to control access to the main memory 13. The graphic controller 14 is a display controller which controls the LCD 15 that is used as a display monitor of the computer. The graphics controller 14 generates, from image data written in the VRAM 14A, a display signal to be transmitted to the LCD 15.

The south bridge 16 is a controller which controls devices on a PCI bus and an LPC bus. Further, the south bridge 16 is directly connected with the BIOS-ROM 17, the HDD 18, the HD DVD 19, and the sound controller 20, and has a function of controlling the connected devices. The sound controller 20 is a sound source controller which controls the speaker 21.

The EC/KBC 22 is a one-chip microcomputer obtained by integrating an embedded controller for electric power control with a keyboard controller for controlling the keyboard 23 and the touch pad 24. The EC/KBC 22 controls supply of electric power from the battery 26 or an external AC power source to the units in the computer, in cooperation with the power supply circuit 25. The network controller 27 is a communication apparatus which executes communications with external networks such as the Internet.

Figure 2:
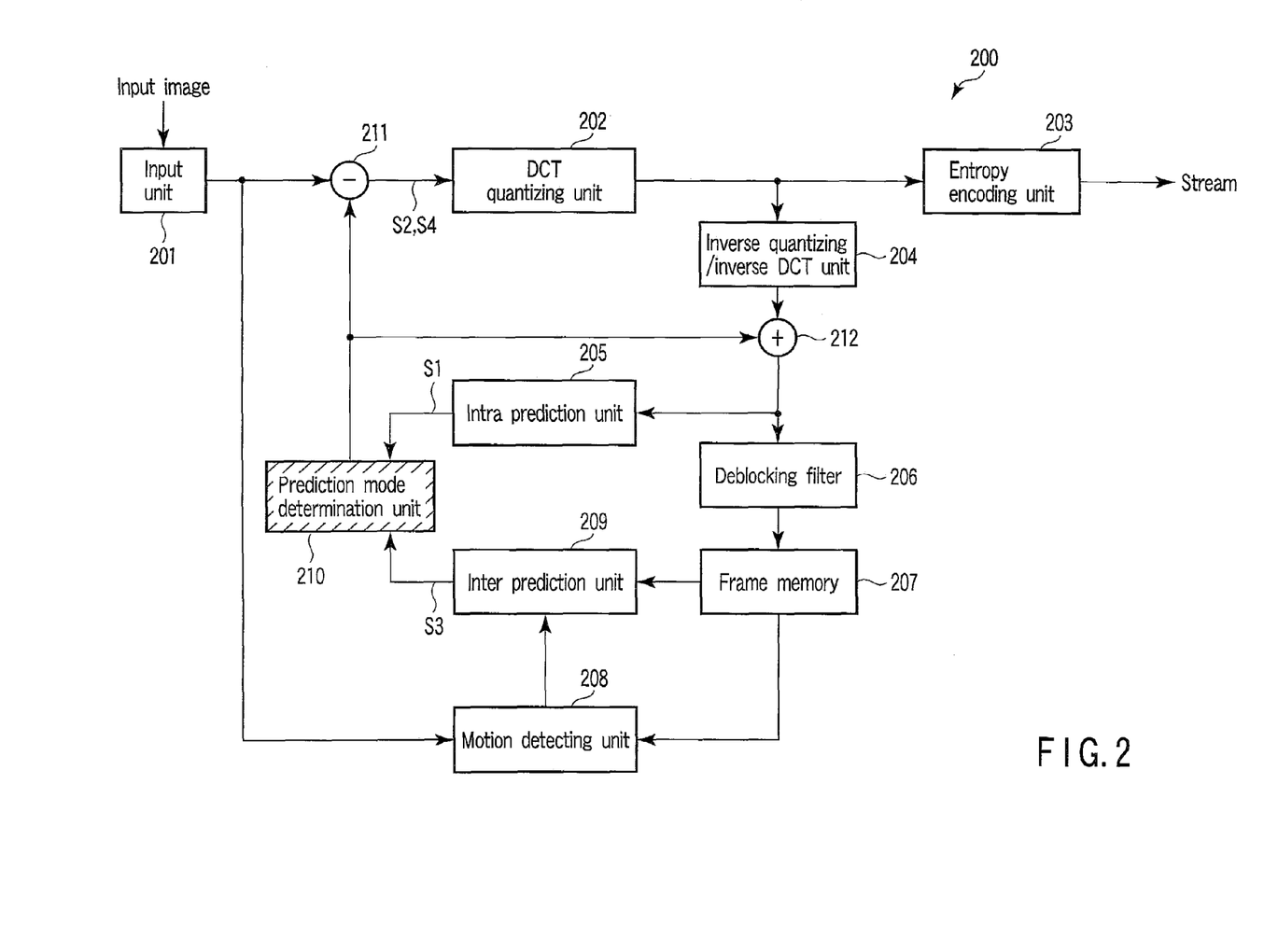
FIG. 2 is an exemplary diagram illustrating a functional configuration of a software encoder realized by a video encoder application operating on the computer of the embodiment.

Next, with reference to FIG. 2, explained is a functional configuration of the software encoder realized by the video encoder application 200 operating on the computer having the above hardware configuration.

Encoding processing performed by the video encoder application 200 is compliant with the H.264/AVC standard. As illustrated in FIG. 2, the video encoder application 200 includes an input unit 201, a DCT quantizing unit 202, an entropy encoding unit 203, an inverse quantizing/inverse DCT unit 204, an intra-prediction unit 205, a deblocking filter 206, a frame memory 207, a motion detecting unit 208, an inter-prediction unit 209, a prediction mode determination unit 210, and adders 211 and 212.

Figure 3:
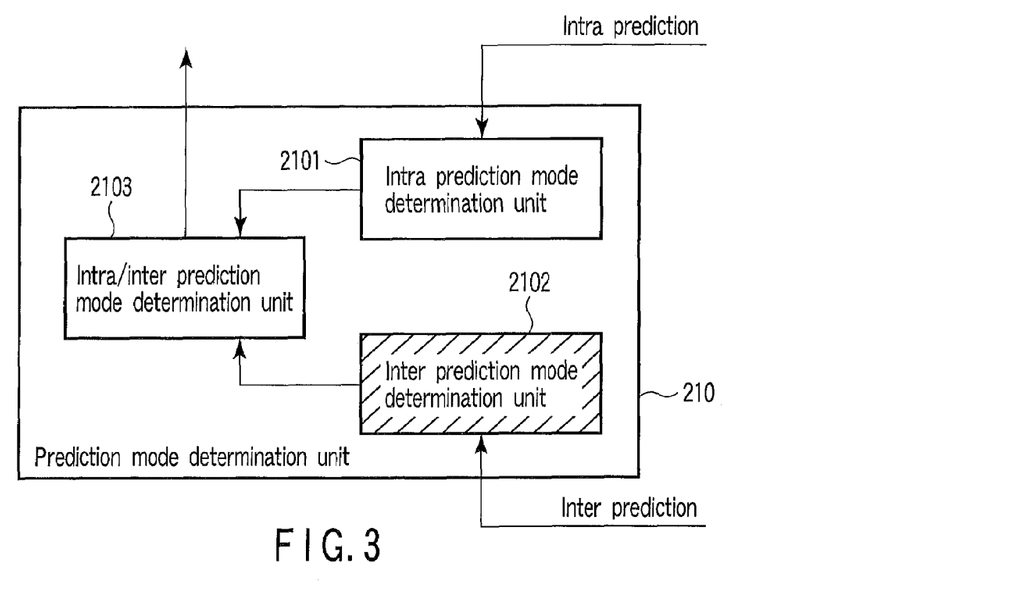
FIG. 3 is an exemplary diagram illustrating a function block of a prediction mode determination unit of the video encoder application operating on the computer of the embodiment.

The video encoder application 200 executes encoding of pictures input through the input unit 201 in macroblocks of, for example, 16×16 pixels. The prediction mode determination unit 210 selects either of an intraframe prediction encoding mode (intra-prediction mode) and a motion compensation interframe prediction encoding mode (inter-prediction mode) for each macroblock. FIG. 3 illustrates the function block of the prediction mode determination unit 210.

As illustrated in FIG. 3, the prediction mode determination unit 210 includes an intra-prediction mode determination unit 2101, an inter-prediction mode determination unit 2102, and an intra/inter-prediction mode determination unit 2103.

Each of the intra-prediction mode and the inter-prediction mode has a plurality of prediction mode candidates which can be selected for each macroblock. First, each of the intra-prediction mode determination unit 2101 and the inter-prediction mode determination unit 2102 selects the most cost-effective (optimum and well-balanced between distortion and code amount) prediction mode candidate from the prediction mode candidates. Then, the intra/inter-prediction mode determination unit 2103 compares the two prediction mode candidates selected by the determination units 2101 and the 2102, and selects a more cost-effective prediction mode, that is, one of the intra-prediction mode and the inter-prediction mode.

Figure 4:
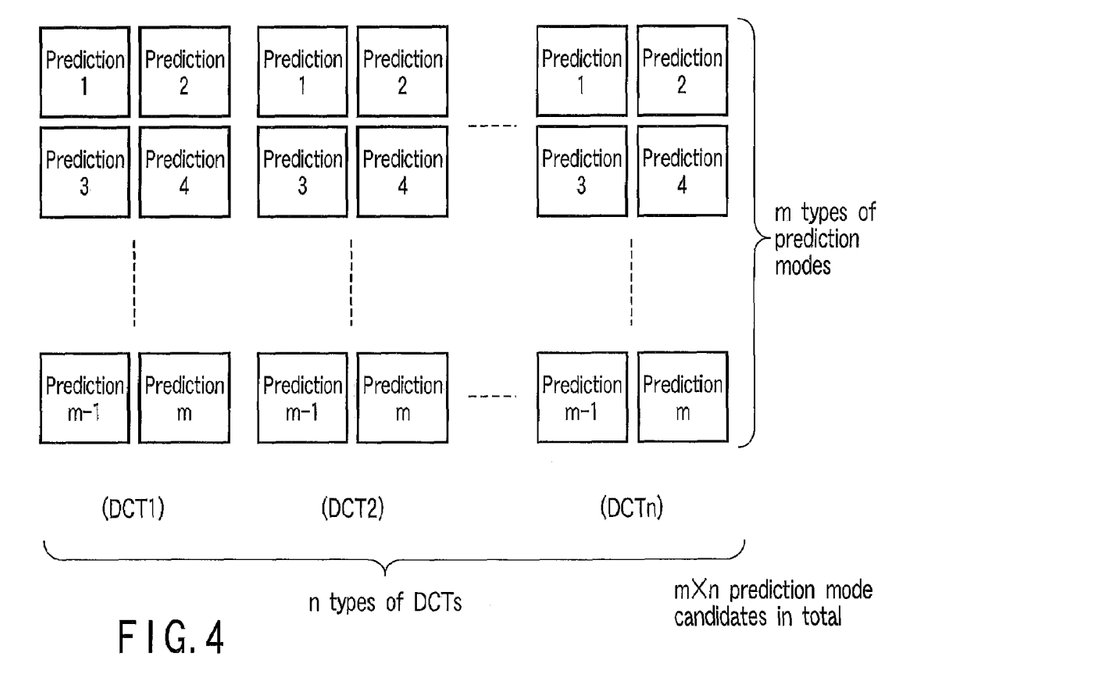
FIG. 4 is an exemplary diagram illustrating a general basic principle of prediction mode determination of inter-prediction.

In the meantime, in high profile of the H.264/AVC standard, when the block size of the prediction mode is 8×8 pixels or more in inter-prediction, it is possible to select an optimum block size from DCT with a block size of 4×4 pixels and DCT with a block size of 8×8 pixels. Therefore, supposing that there are m types of prediction modes in one standard and n types of DCTs are selectable, there are substantially m×n prediction mode candidates only for the inter-prediction, as illustrated in FIG. 4. In such circumstances, if all the prediction mode candidates are evaluated without any contrivance to select an optimum prediction mode candidate, the processing amount required for prediction mode determination of the inter-prediction becomes enormous. Therefore, the inter-prediction mode determination unit 2102 of the computer has a mechanism for efficiently performing prediction mode determination while suppressing deterioration in image quality. This point is explained in detail below.

In the software encoder whose functional configuration is illustrated in FIG. 2, in the intra-prediction encoding mode, the intra-prediction unit 205 generates a prediction signal s1 from a picture to be encoded, and the DCT quantizing unit 202 performs orthogonal transformation and quantization for a prediction error signal s2 obtained by subtracting the prediction signal s1 from the picture to be encoded. Then, the entropy encoding unit 203 performs entropy encoding for intra-prediction mode information and the quantized orthogonal transformation coefficient, and thereby encoding of the picture is performed.

On the other hand, in the inter-prediction encoding mode, first, the motion detecting unit 208 estimates motion from an encoded picture stored in the frame memory 207, and then the inter-prediction unit 209 generates a motion compensating interframe prediction signal s3 corresponding to a picture to be encoded, in a predetermined form and unit. Thereafter, the DCT quantizing unit 202 performs orthogonal transformation and quantization for a prediction error signal s4 obtained by subtracting the motion compensating interframe prediction signal s3 from the picture to be encoded. Then, the entropy encoding unit 203 performs entropy encoding for inter-prediction mode information and the quantized orthogonal transformation coefficient, and thereby encoding of the picture is performed.

The inverse quantizing/inverse DCT unit 204 performs inverse quantization and inverse orthogonal transformation for a quantization coefficient of a picture subjected to orthogonal transformation and quantization. The deblocking filter 206 performs deblocking filtering for reducing block noises.

Figure 5:
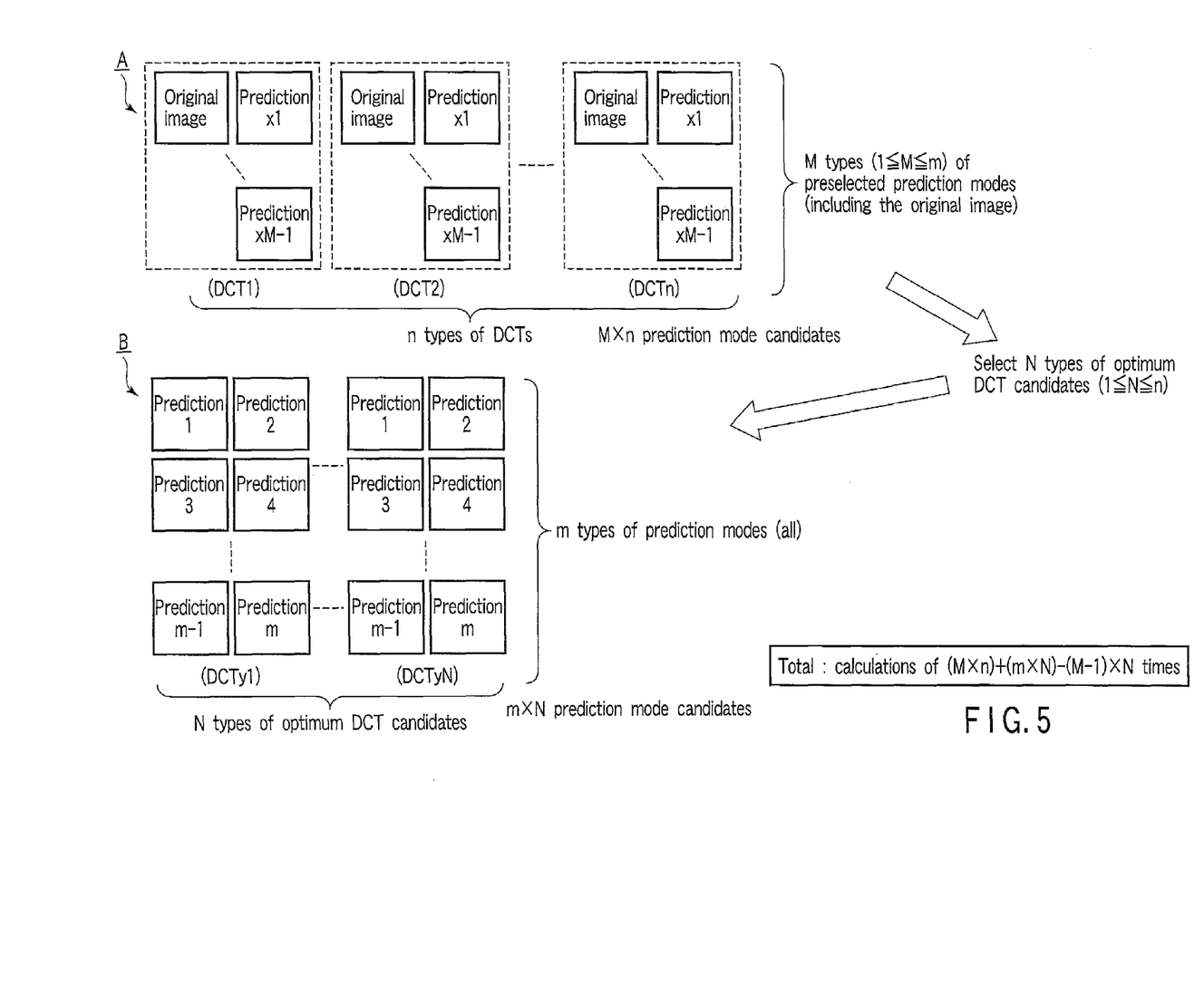
FIG. 5 is an exemplary diagram illustrating a basic principle of prediction mode determination performed by the inter-prediction mode determination unit of the video encoder application operating on the computer of the embodiment.

FIG. 5 is an exemplary diagram illustrating a basic principle of prediction mode determination performed by the inter-prediction mode determination unit 2102 of the computer.

An optimum DCT block size tends to be the same between different prediction block sizes with high probability. Therefore, even when DCT (DCT block size) is selected first to narrow down DCTs for each of which an optimum prediction mode (prediction block size) is selected, it can be said that a combination of a truly optimum prediction mode and DCT can be selected with comparatively high probability. In view of this tendency, the inter-prediction mode determination unit 2102 of the computer performs DCT determination under conditions of a specific prediction mode, and selects optimum DCT candidates ("A" of FIG. 5). In this DCT determination, it is possible to use original images in an unpredicted state. Then, the inter-prediction mode determination unit 2102 performs determination to select an optimum prediction mode only for the optimum DCT candidates, and determines an ultimate combination of a DCT and a prediction mode ("B" of FIG. 5). In the determination, since the specific prediction mode has been evaluated in selection of the optimum DCT candidates, it suffices to perform evaluation only for prediction modes other than the specific prediction mode.

Figure 6:
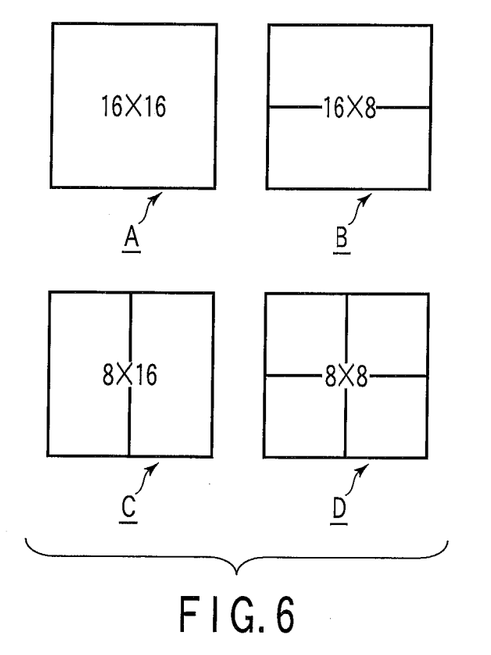
FIG. 6 is an exemplary first diagram illustrating a specific of prediction mode determination executed by the inter-prediction mode determination unit of the video encoder application operating on the computer of the embodiment (diagram illustrating types of prediction modes)
Figure 7:
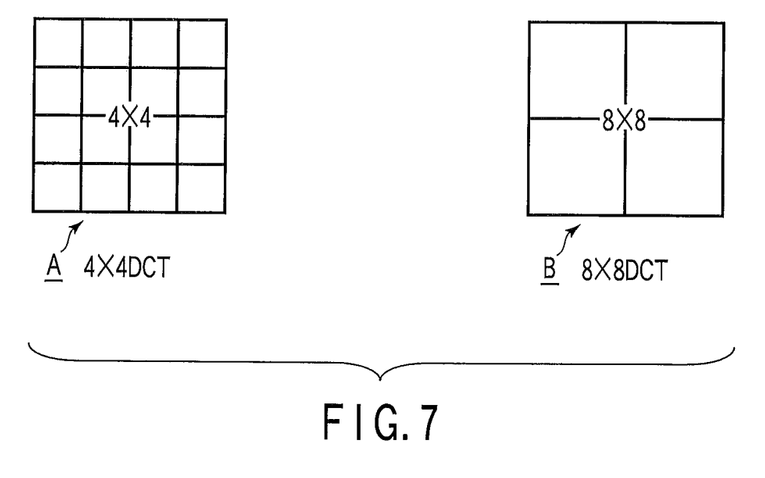
FIG. 7 is an exemplary second diagram illustrating the specific of prediction mode determination executed by the inter-prediction mode determination unit of the video encoder application operating on the computer of the embodiment (diagram illustrating types of DCTs)

This method will be explained below with a more specific example. In high profile of the H.264/AVC standard, there are four types of prediction modes having different block sizes of 16×16 pixels, 16×8 pixels, 8×16 pixels, and 8×8 pixels as the processing unit, as illustrated in FIG. 6. Further, in the high profile of the H.264/AVC standard, there are 2 types of DCTs having different block sizes of 4×4 pixels and 8×8 pixels as the processing unit, as illustrated in FIG. 7. Therefore, the number of prediction mode candidates is 8, which is obtained by 4 (m of FIGS. 4 and 5)×2 (n of FIGS. 4 and 5).

On the other hand, the inter-prediction mode determination unit 2102 performs evaluation of the two DCTs of 4×4 pixels and 8×8 pixels only in 1 (M of FIG. 5) prediction mode of, for example, 16×16 pixels (the number of candidates is 1(M)×2 (n)), and selects 1 (N of FIG. 5) optimum prediction mode candidate, for example. In this processing, a prediction mode other than the prediction mode of 16×16 pixels may be used as a matter of course.

Next, DCT evaluation is performed in the other prediction modes of 16×8 pixels, 8×16 pixels, and 8×8 pixels, only for the 1 optimum DCT candidate obtained by the prediction mode of 16×16 pixels (the number of candidates is 3(m–M)× 1(N): since the original image is used for DCT determination in the case illustrated in FIG. 5, the number of candidates is obtained by the expression "(m–(M–1))×N", that is, "(m× N)–(M–1)×N"). Thereby, the ultimate optimum prediction mode is determined.

Specifically, in this case (in which one optimum DCT candidate is selected), the inter-prediction mode determination unit 2102 achieves reduction in the number of prediction mode candidates to "2+3=5" (that is, the number of candidates is reduced by 3). Since there is high probability that the optimum DCT is the same between the different prediction modes of 16×16 pixels, 16×8 pixels, 8×16 pixels, and 8×8 pixels, a truly optimum combination can be selected with high probability, and deterioration in image quality hardly occurs.

In addition, the inter-prediction mode determination unit 2102 of the computer performs control to determine one prediction mode candidate used for selection of DCT in B pictures, for which prediction succeeds with high probability, and increase the number of prediction mode candidates to 2 in P pictures. Specifically, the inter-prediction mode determining unit 2102 determines the number of prediction mode candidates used for selection of DCT in accordance with the type of the picture, and thereby achieves reduction in the processing amount required for prediction mode determination while adaptively suppressing deterioration in image quality.

Figure 8:
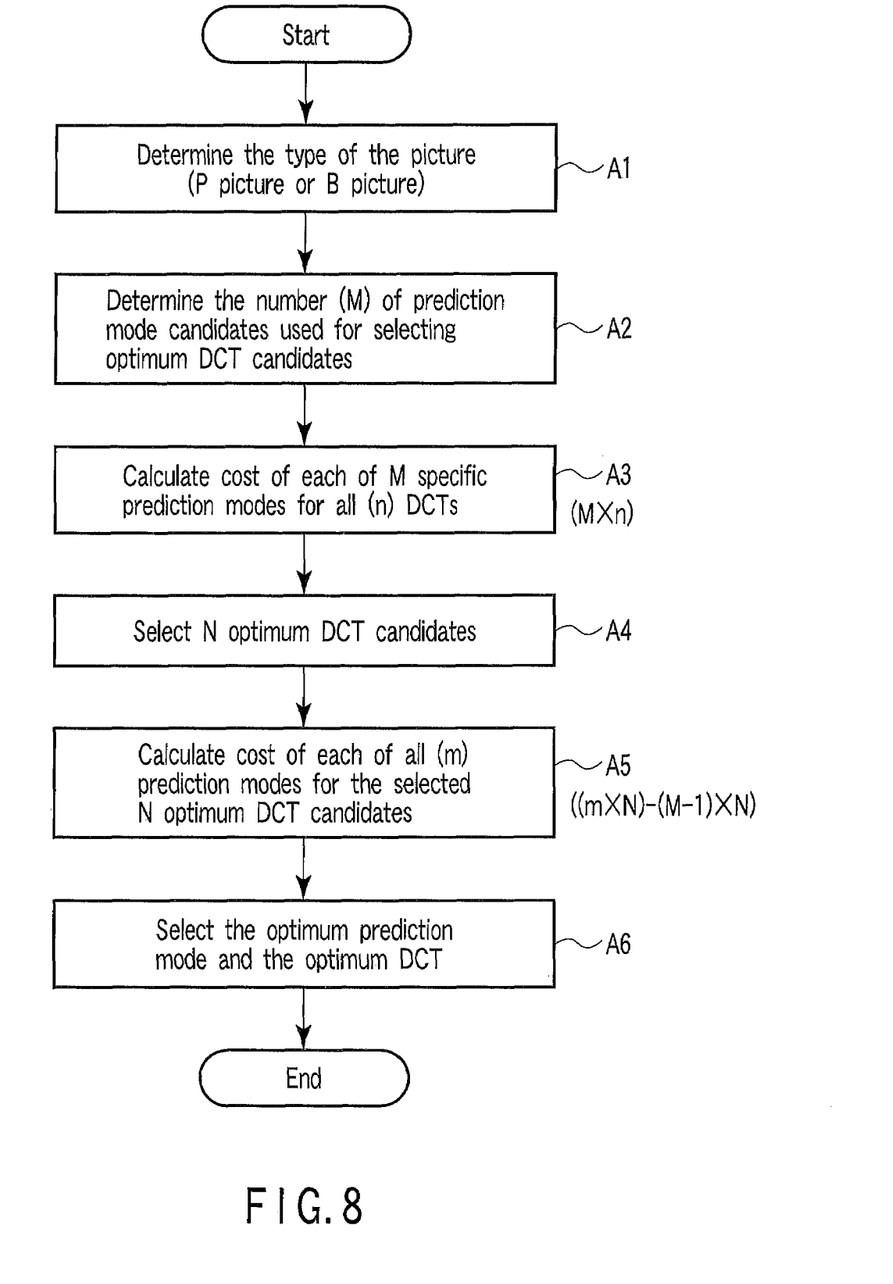
FIG. 8 is an exemplary flowchart illustrating an operation procedure of prediction mode determination executed by the inter-prediction mode determination unit of the video encoder application operating on the computer of the embodiment.

FIG. 8 is an exemplary flowchart illustrating an operation procedure of prediction mode determination executed by the inter-prediction mode determination unit 2102 of the computer.

First, the inter-prediction mode determination unit 2102 determines whether the picture to be encoded is a P picture or a B picture (Block A1), and determines the number of prediction mode candidates used for selection of DCT, based on the determination result (Block A2). For example, if the picture is a P picture, the number of prediction mode candidates is set to 2. If the picture is a B picture, the number of prediction mode candidates is set to 1.

Next, the inter-prediction mode determination unit 2102 calculates the cost of each of all the DCTs for the specific prediction mode candidate(s) of the number determined in Block A2 (Block A3). Based on a result of the cost calculation, the inter-prediction mode determination unit 2102 selects optimum DCT candidates of the predetermined candidate number (Block A4).

Then, the inter-prediction mode determination unit 2102 calculates the cost of each of the other prediction mode candidates than the specific prediction mode candidate only for the selected DCTs (Block A5), and determines the optimum prediction mode and the optimum DCT (among the calculated costs including the costs concerning the specific prediction mode candidate(s) already calculated in Block A3) (Block A6).

As described above, according to the computer of the present invention, it is possible to efficiently perform prediction mode determination of inter-prediction, without deterioration in image quality or the like.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processor and a memory storing an encoder configured to encode a moving image signal, wherein:
the encoder, when executed by the processor, is configured to:
generate a prediction signal, using one of a plurality of types of inter-prediction modes having different block sizes as a processing unit, for each of macroblocks obtained by dividing a picture to be encoded, the one of the plurality of types of inter-prediction modes being an optimum type of inter-prediction mode;
perform orthogonal transformation for a prediction residual signal, by using one of a plurality of types of DCTs having different block sizes as processing unit, wherein the prediction residual signal is obtained by subtracting the prediction signal from a picture signal of the macro block, and wherein the one of the plurality of types of DCTs is an optimum DCT; and
determine a combination of the optimum inter-prediction mode used by an inter-prediction unit and the optimum DCT used by the transformation unit for each of the macroblocks,
the determining of the combination comprises:
calculating first costs associated with each of one or more specified types of inter-prediction modes in combination with each of the plurality of types of DCTs, a number of the one or more specified types of inter-prediction modes being smaller than a total number of the plurality of types of inter-prediction modes;
selecting a predetermined number of types of DCTs from the plurality of types of DCTs, based on the calculated first costs, the predetermined number being smaller than a total number of the plurality of types of DCTs;
calculating second costs associated with each of the plurality of types of inter-prediction modes in combination with each of the selected predetermined number of types of DCTs; and
selecting one of the plurality of types of inter-prediction modes as the optimum inter-prediction mode and one of the selected predetermined number of types of DCTs as the optimum DCT based on the calculated second costs.

2. The information processing apparatus according to claim 1, wherein the determining of the combination comprises selecting the DCTs of the predetermined number from the DCTs, by using an image signal of an original image, in addition to prediction signals generated in the one or more specified types of inter-prediction mode.

3. The information processing apparatus according to claim 1, wherein:
the plurality of types of DCTs comprise two DCTs, the two DCTs including a DCT having a first block size as a processing unit and a DCT having a second block size which is larger than the first block size as a processing unit; and
the predetermined number of types of DCTs is one of the two DCTs.

4. The information processing apparatus according to claim 1, wherein the first block size is 4×4 pixels, and the second block size is 8×8 pixels.

5. The information processing apparatus according to claim 1, wherein the block sizes of the plurality of types of inter-prediction modes are 16×16 pixels, 16×8 pixels, 8×16 pixels, and 8×8 pixels.

6. The information processing apparatus according to claim 1, wherein the predetermined number is determined in accordance with a type of picture to be encoded.

7. The information processing apparatus according to claim 6, wherein the predetermined number that is determined when the picture to be encoded is a B type picture is smaller than the predetermined number determined when the picture to be encoded is a P type picture.

8. The information processing apparatus according to claim 1, wherein the calculating the second costs excepts calculating costs associated with each of the one or more specified types of inter-prediction modes in combination with each of the selected predetermined number of types of DCTs.

9. An inter-prediction mode determination method for an information processing apparatus, which encodes a moving image signal and includes an inter-prediction unit configured to generate a prediction signal, using one of a plurality of inter-prediction modes having different block sizes as a processing unit, for each of macroblocks obtained by dividing a picture to be encoded, and a transformation unit configured to perform orthogonal transformation for a prediction residual signal, by using one of a plurality of DCTs having different block sizes as a processing unit, the one of the plurality of types of inter-prediction modes is an optimum inter-prediction mode and the one of the plurality of DCTs is an optimum DCT, the method comprising:
for each of the macroblocks,
calculating first costs associated with each of one or more specified types of inter-prediction modes in combination with each of the plurality of types of DCTs, a number of the one or more specified types of inter-prediction modes being smaller than the total number of the plurality of types of inter-prediction modes;
selecting a predetermined number of types of DCTs from the plurality of types of DCTs, based on the calculated first costs, the predetermined number being smaller than a total number of the plurality of types of DCTs;
calculating second costs associated with each of the plurality of types of inter-prediction modes in combination with each of the selected predetermined number of types of DCTs, and
selecting one of the plurality of types of inter-prediction modes as the optimum inter-prediction mode and one of the selected predetermined number of types of DCTs as the optimum DCT based on the calculated second costs.

10. The inter-prediction mode determining method according to claim 9, wherein:
the plurality of types of DCTs comprise two DCTs, the two DCTs including a DCT having a first block size as a processing unit and a DCT having a second block size which is larger than the first block size as a processing unit; and
the predetermined number of types of DCTs is one of the two DCTs.

11. The inter-prediction mode determining method according to claim 9, wherein the first block size is 4×4 pixels, and the second block size is 8×8 pixels.

12. The inter-prediction mode determining method according to claim 9, wherein the predetermined number is determined in accordance with a type of picture to be encoded.

13. The inter-prediction mode determining method according to claim 12, wherein the predetermined number that is determined when the picture to be encoded is a B type picture is smaller than the predetermined number determined when the picture to be encoded is a P type picture.

* * * * *